United States Patent

Hammis

[11] Patent Number: 5,944,948
[45] Date of Patent: Aug. 31, 1999

[54] APPARATUS FOR ASSEMBLING A PAIR OF MEMBERS

[75] Inventor: James F. Hammis, Saginaw, Mich.

[73] Assignee: Centennial Technologies, Inc., Saginaw, Mich.

[21] Appl. No.: 09/054,089

[22] Filed: Apr. 2, 1998

[51] Int. Cl.$^6$ .............................. B32B 31/00; B22C 7/00
[52] U.S. Cl. ....................... 156/556; 156/580; 164/246
[58] Field of Search .............................. 164/45, 239, 240, 164/246, 247; 156/556, 580, 230

[56] References Cited

U.S. PATENT DOCUMENTS

| 4,572,762 | 2/1986 | Winston | 156/556 |
| 4,883,558 | 11/1989 | Bellis et al. | 156/292 |
| 5,245,736 | 9/1993 | Schertler | 29/33 P |
| 5,264,069 | 11/1993 | Dietrich et al. | 156/559 |
| 5,368,645 | 11/1994 | Bok | 118/500 |
| 5,407,523 | 4/1995 | Bailey et al. | 156/556 |

FOREIGN PATENT DOCUMENTS

| 61-169133 | 7/1986 | Japan | 164/45 |
| 2-280941 | 11/1990 | Japan | 164/45 |

*Primary Examiner*—Harold Pyon
*Assistant Examiner*—J.-H. Lin
*Attorney, Agent, or Firm*—Reising, Ethington, Barnes, Kisselle, Learman & McCulloch, P.C.

[57] ABSTRACT

Assembling and adhering two component parts of a lost foam pattern comprises placing each of the two components on separate supports which initially face in the same direction, following which one of the supports and the component supported thereby are rotated through substantially 180° to a position in which the two components confront and face one another. Each component has an exposed surface which confronts the other. An adhesive is applied to the exposed surface of one of the components, following which the supports are moved toward one another a distance sufficient to enable the confronting surfaces to engage and bond to one another. Thereafter the bonded components are separated from their respective supports and removed. The separate components are placed on their respective supports and the bonded components removed from such supports at a level which is ergonomically appropriate for the machine operator.

13 Claims, 7 Drawing Sheets

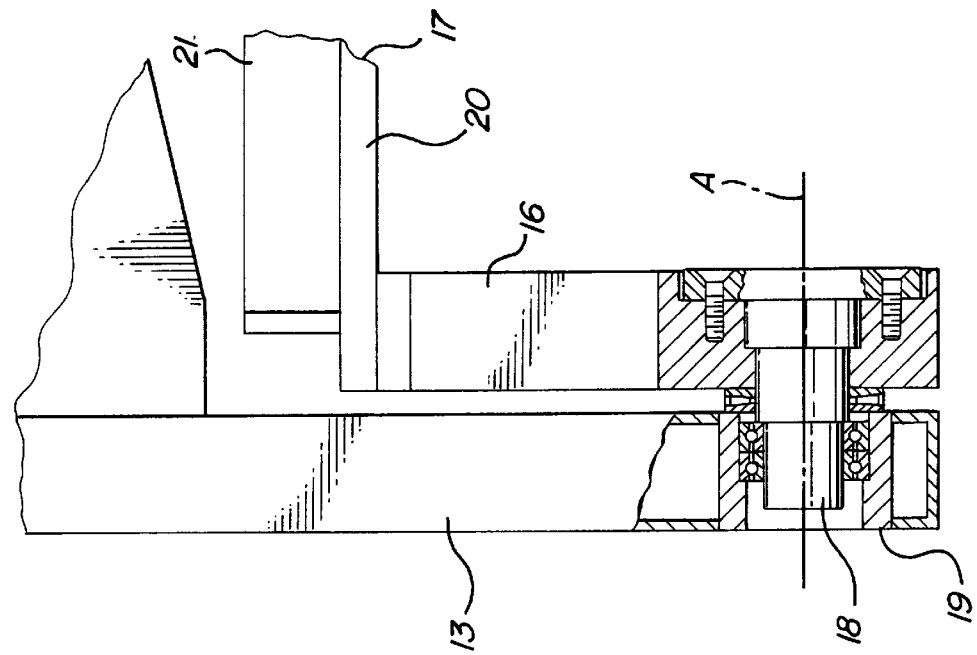
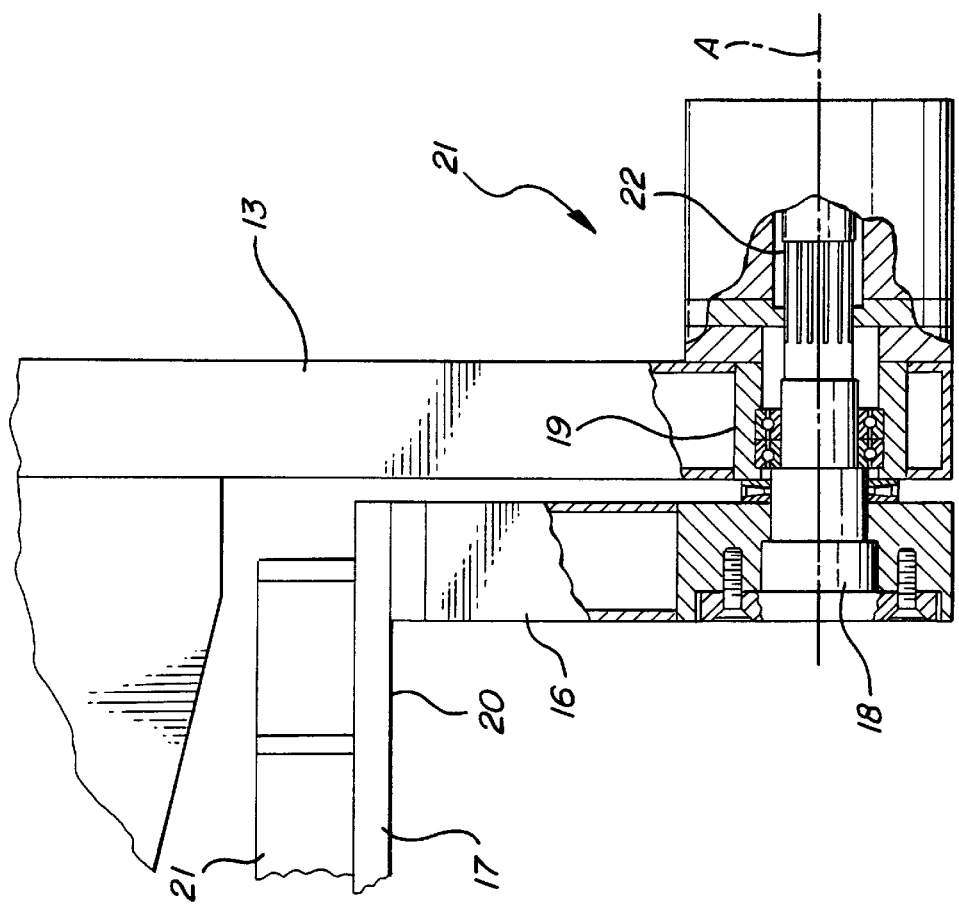

_5,944,948_

1

APPARATUS FOR ASSEMBLING A PAIR OF MEMBERS

This invention relates to a method and apparatus for assembling and adhering to one another a pair of members and more particularly to the assembly of foam components which, when assembled, form a pattern for use in the lost foam casting of metal products such as cylinder blocks and heads.

BACKGROUND OF THE INVENTION

In the casting of metal products it is conventional to form from a plurality of components a lost foam pattern of the product that is to be formed in the casting operation. The components of the pattern initially are separate from one another as a consequence of which such components must be assembled and bonded to one another so as to provide the desired pattern. The components conventionally are delivered to an assembling machine at which a machine operator loads two components on separate supports or platens which then are adjusted relative to one another in such manner as to enable an adhesive to be applied to one of the components following which the two components are moved into abutting relationship and bonded to each other.

One of the undesirable characteristics of known apparatus for assembling components of lost foam patterns with one another is that the machine operator is required to lift, and possibly rock, at least one of the components to an elevated position in securing such component to that part of the machine to which it must be secured prior to the assembling and adhering operation. The necessity of having to lift components repetitively over the operator's working period is fatiguing.

In the use of machines heretofore available it is not uncommon for at least one of the machine parts to be movable in such directions as to present the possibility that such machine part or a component supported thereby may be a threat to the machine operator in the event of a failure of the machine part or the inadvertent release of a component.

An object of the invention is to provide a method and apparatus which overcome the disadvantages referred to above.

SUMMARY OF THE INVENTION

Apparatus for assembling and adhering together component parts of a lost foam pattern comprises a frame adjacent one end of which are first and second supports on which first and second components, respectively, of a lost foam pattern may be supported. The first support occupies an initial position for receiving a first pattern component, following which such support is rotated to an adjusted position in which the component supported on the first support overlies and confronts a second support on which a second pattern component is supported. The first support and the component supported thereby then are moved to an intermediate position at which a coating of adhesive is applied to the first component, following which the first support and the component supported thereby are returned to a position overlying the second component. The first and second supports then are moved relative to one another in such direction as to cause the two components to engage one another so that the adhesive bonds the components together. Thereafter, the bonded components are removed and the process repeated using two additional components.

When the first and second components are moved onto their respective first and second supports, the latter are maintained in a position which is ergonomically appropriate for the minimization of operator fatigue.

The apparatus includes a frame on which are mounted two supports for respectively supporting two components that subsequently are to be joined together. The first support has a supporting surface on which one of the components may be secured and the second support has a supporting surface on which the second component may be secured. Initially, the supporting surfaces of the two supports face upwardly. However, following the securing of a first component to the first support the latter is rotated to an elevated position in which the component supported thereby overlies and confronts the supporting surface of the second support. The direction and extent of rotation of the first support are such that potential injury to the machine operator is minimized.

Following rotation of the first support it is moved to a position overlying a tank in which an adhesive is maintained. At that position a coating of adhesive is applied to the exposed, downwardly facing surface of the component secured to the first support. The first support then is returned to a position in which it overlies the second support.

During the movement of the first support to the adhesive-applying station the second support may be moved upwardly to a loading position at which the second component is secured atop the second support. The level of such loading position again is ergonomically appropriate.

Following loading of the second component on the second support, the second support is moved upwardly a distance to enable the upper surface of the second component to abut the downwardly facing surface of the first component so that the adhesive carried by the first component is enabled to bond the two components to one another.

Following the bonding of the two components the component secured to the first support is released, thereby enabling the bonded components to be lowered to an unloading position whereupon the second component is released from the second support. The first support, now free of its component, is rotated to its loading position whereupon a fresh component is secured to the first support and the process repeated.

THE DRAWINGS

A preferred embodiment of the invention is disclosed in the accompanying drawings wherein:

FIGS. 6 and 7 are enlarged, fragmentary views partly in elevation and partly in section of details of a rotary support forming part of the invention.

THE PREFERRED EMBODIMENT

Figure 5:
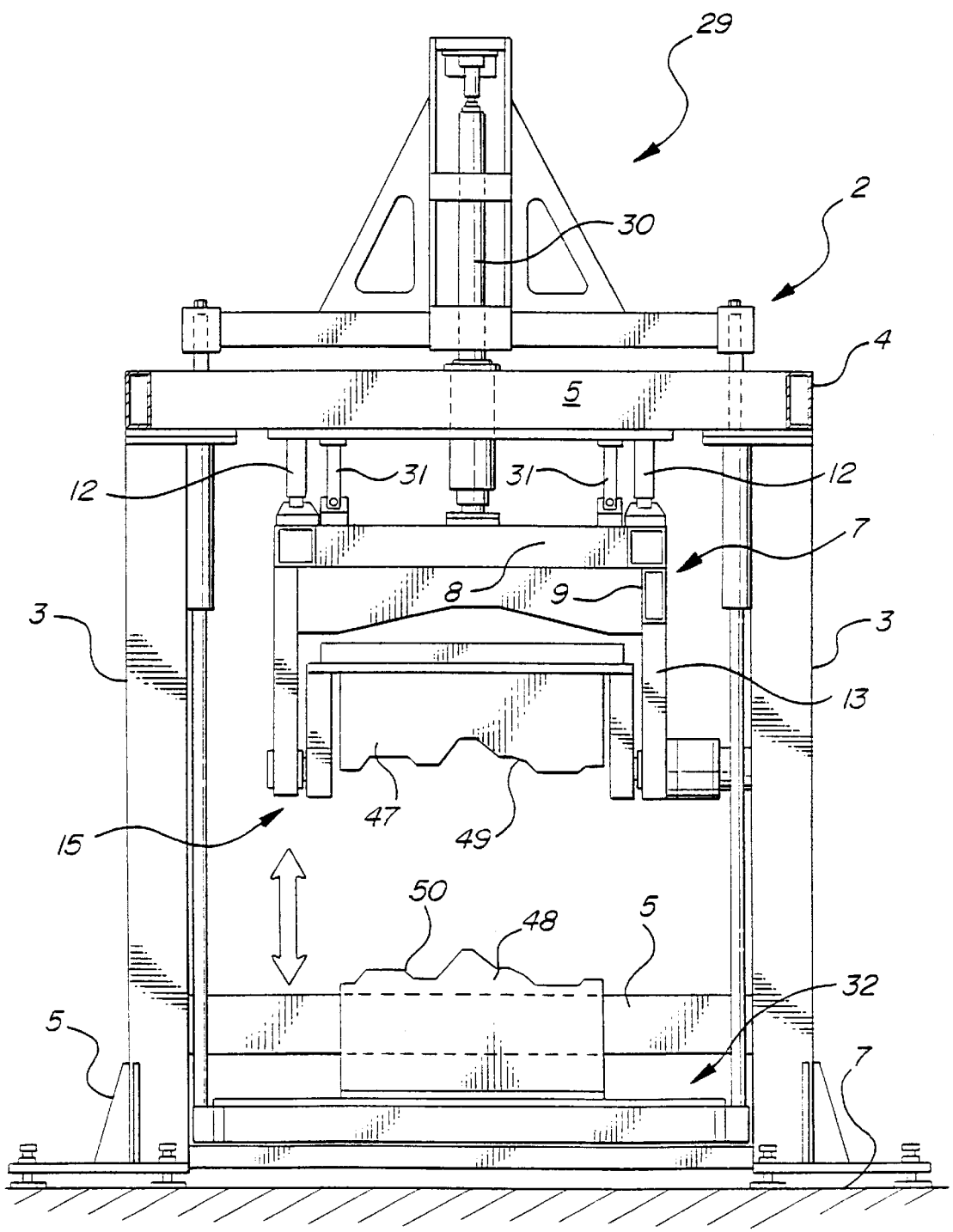
FIG. 5 is an end elevational view of the apparatus showing the parts in the positions illustrated in FIG. 2 and as viewed from the left hand end of the latter figure.

Apparatus for use in assembling and adhering two parts, such as lost foam pattern components, to one another is designated generally by the reference character 1 and comprises a main frame 2 having spaced apart uprights 3 joined adjacent corresponding ends by crossbars 4, the uprights 3 having supports 5 (FIG. 5) for engagement with a floor or other base 6. The details of the frame are well known and may vary from that illustrated.

Mounted on the frame 2 is a carriage 7 comprising end and side frame members 8 and 9, respectively, and suspended by links 10 having rollers slideable on tracks 11 carried by longitudinally extending, parallel frame members 12. The carriage includes, at each of its opposite sides, downwardly diverging frame members 13 and 14 which are joined at their lower ends. A pattern component-supporting member 15 has spaced apart, parallel, substantially triangular walls 16 joined to one another by a transverse, horizontal web 17. Each of the side walls 16 has a stub shaft 18 journaled in bearings 19 carried by the carriage at the juncture of the respective members 13 and 14. As is best shown in FIGS. 6 and 7, the web 17 has at one side a flat support surface 20 and at the other side a reinforcing rib structure 21 which may also constitute a manifold having air passages (not shown) in communication with the surface 20 for the purpose of enabling suction to be applied in a known manner to an article supported on the surface 20.

Figure 8:
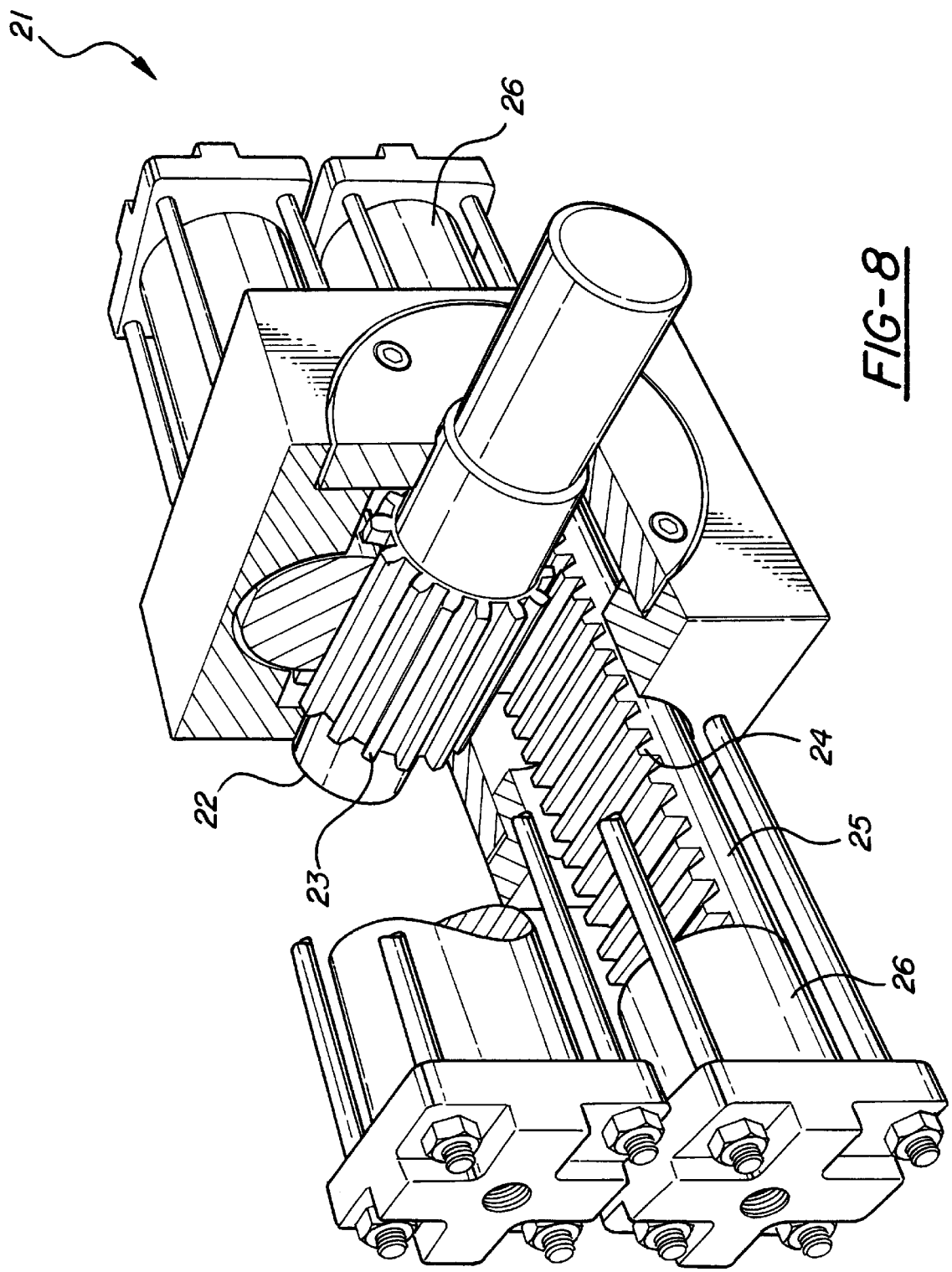
FIG. 8 is an isometric view, on an enlarged scale, of mechanism for effecting rotation of the rotary support shown in FIGS. 6 and 7.

The supporting member 15 is rotatable about a horizontal axis A (FIGS. 6 and 7) in each of two opposite directions as is indicated by the arrow B. A known rotary actuator mechanism designated generally by the reference character 21 (FIG. 8) is provided for rotating the supporting member 15 and comprises a pinion shaft 22 formed as an extension of one of the stub shafts 18, such pinion shaft having gear teeth 23 in mesh with teeth 24 on a horizontal rack which is reciprocal by means of opposed hydraulic or pneumatic ram assemblies 26. The apparatus 21 may correspond to that manufactured by Flo-Tork, Inc., of Orrville, Ohio. Movement of the rack 25 in one direction causes rotation of the supporting member 15 in one direction and vice versa.

The support surface 20 of the web 17 may be adjusted to a selected level above the floor 7 by means of vertical adjusting apparatus designated generally by the reference character 29. The adjusting apparatus may be of any suitable and conventional kind and, as shown, has hydraulic or pneumatic cylinder assemblies 30 and 31 which may be operated to position the surface 20 of the web 17 at an ergonomically appropriate level for an operator of the machine.

The apparatus also includes a second support member 32 comprising a platen 33 having a flat article supporting surface 34 and being mounted for vertical movements in the directions of the double arrow C. The platen 33 is moved by means of a fluid cylinder assembly 35 and is guided by vertical guide rods 36. The platen 33 is adapted to accommodate an article on the upwardly facing supporting surface 34 and the latter has openings (not shown) therein in communication with a vacuum source (not shown) so as to enable the article to be secured on the platen by suction.

The apparatus also includes a tank 37 supported on a subframe 38 and having a reservoir 39 therein for the accommodation of a liquid adhesive. Suspended in the reservoir 39 by means of hanger arms 40 is a support 41 on which an adhesive applicator 42 is fixed. The support 41 is vertically movable in the direction of the double arrow D by means of fluid cylinder assemblies 43. The height of the support 41 relative to the reservoir 39 may be adjusted by means of known adjusting apparatus 44.

The construction of the apparatus is such as to enable the carriage 7 and its associated parts to be accommodated between the cylinder assemblies 43 in a position in which the support 15 directly overlies the applicator 42. The carriage 7 is reciprocable between the positions shown in FIGS. 1 and 3 and in the directions of the double arrow E by means of fluid cylinder assemblies 45.

The apparatus is especially useful in adhering two components of a lost foam pattern to one another. For purpose of illustration, one of the pattern components is shown at 47 in FIG. 5 and the other component is shown at 48. The component 47 is secured to the surface 17 of the support 15 by suction, or in any other suitable manner, and has an exposed, irregular surface 49. The component 48 is secured to the surface 34 of the platen 33 by suction or in any other suitable manner and has an exposed surface 50 that is complementary to the surface 49. The two components are intended to be bonded together at their surfaces 49 and 50.

Figure 1:
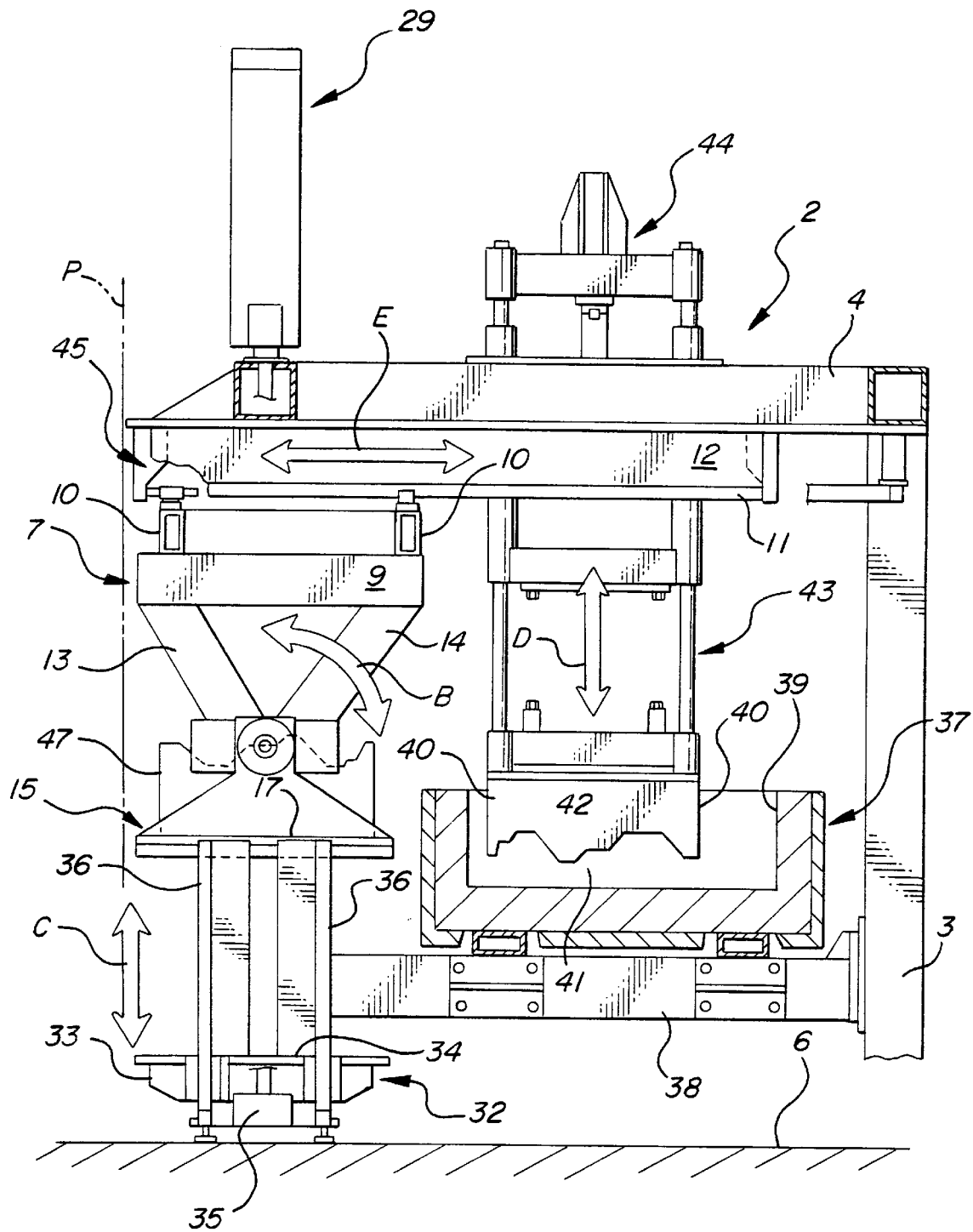
FIG. 1 is a fragmentary, side elevational view showing the parts in one relative position of adjustment.

To condition the apparatus for use, the carriage 7 and the platen 33 initially will occupy the vertically spaced positions shown in FIG. 1. In the disclosed position of the support member 15 its support surface 17 is horizontal, faces upwardly, and is at a level ergonomically appropriate for the machine operator as to enable the operator simply to slide the component 47 horizontally onto the supporting surface 17 where it may be secured. By locating the supporting surface 17 initially at an ergonomically appropriate level and in a horizontal position, the machine operator is spared the necessity of having to lift, rotate, or otherwise manipulate the component in such manner as to induce fatigue.

When the component 47 is secured atop the support surface 17 of the member 15, the component's surface 49 will face upwardly, but does not confront the platen 33. It is necessary, therefore, to overturn the component so that its surface 49 faces downwardly. This is accomplished by operating the mechanism 21 in such manner as to rotate counterclockwise the support member 15 and the component 49 secured thereto, as shown in FIG. 1, to the adjusted position shown in FIG. 2. These two positions are angularly spaced from one another by substantially 180°, as a consequence of which the support member 15, in the FIG. 2 position, overlies the platen 33 with the supporting surfaces 17 and 34, respectively, facing but spaced from one another. Suitable anchoring means, such as a shot pin (not shown) may be provided to secure the member 15 in its adjusted position in a known manner.

Figure 2:
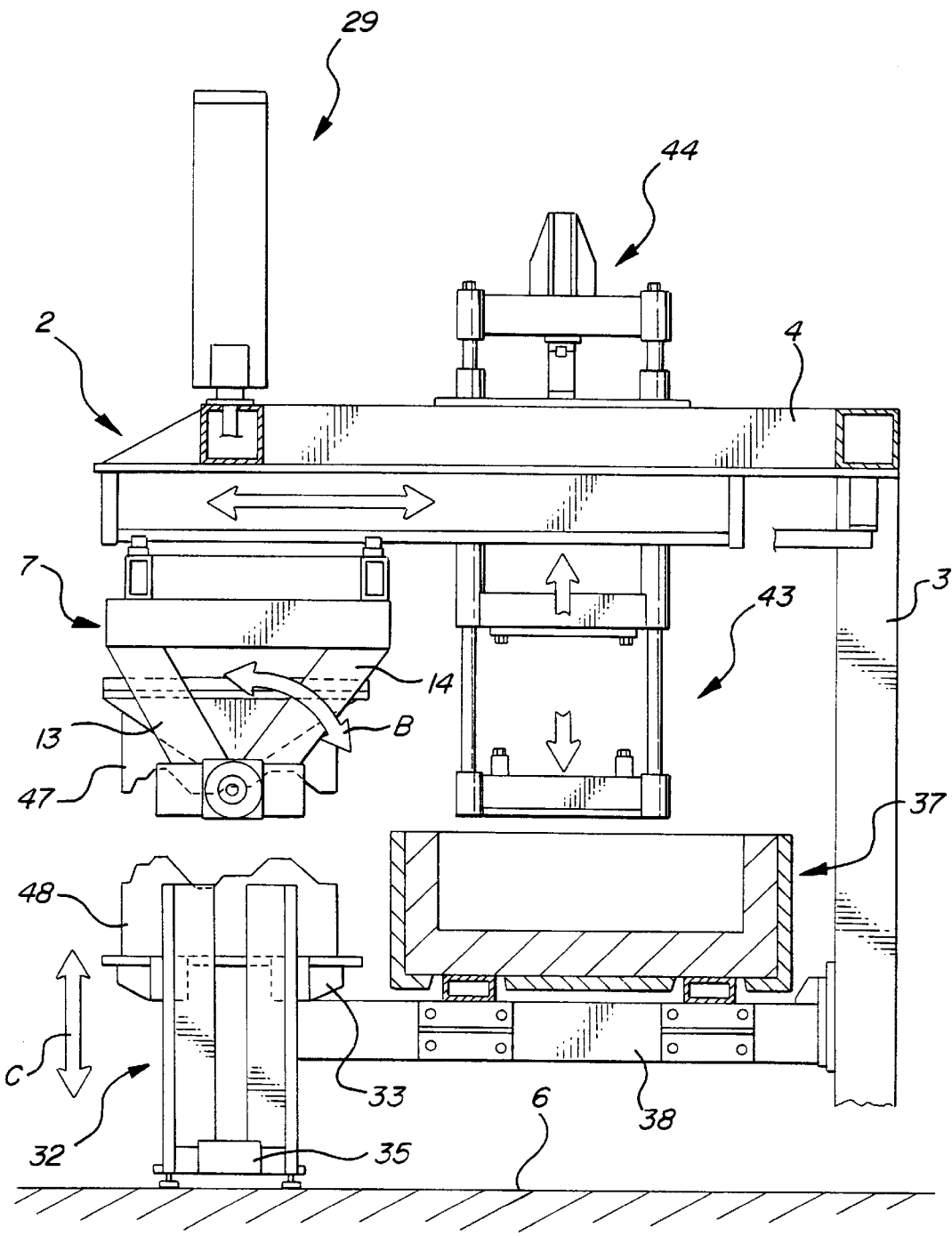
FIG. 2 is a view similar to FIG. 1, but showing some of the parts in adjusted positions.
Figure 3:
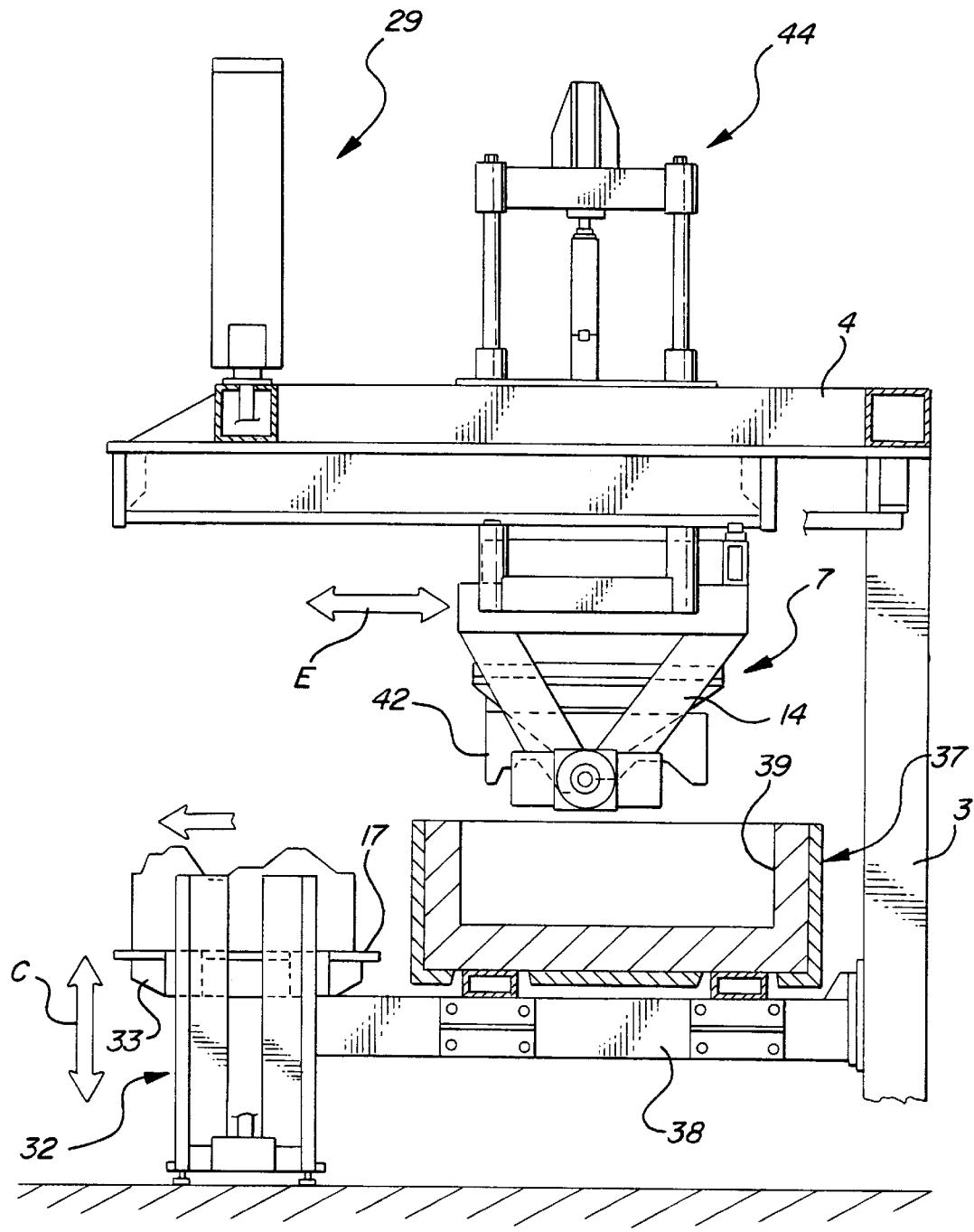
FIG. 3 is a view similar to FIGS. 1 and 2, but showing some of the parts of the apparatus in another position of adjustment.
Figure 4:
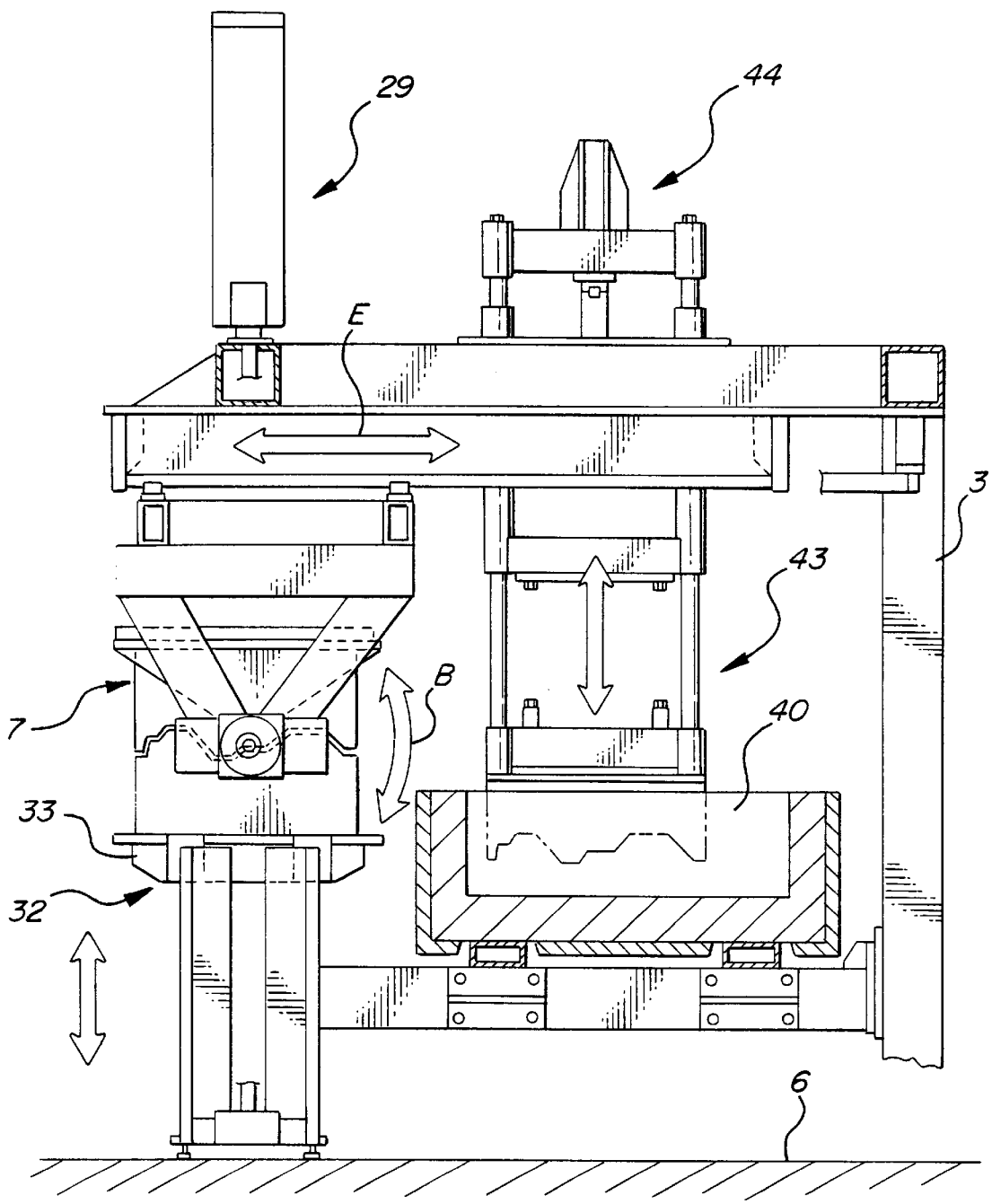
FIG. 4 is a view similar to FIGS. 1 and 2 but showing some of the parts of the apparatus in still another position of adjustment.

Following rotation of the support member 15 and the component 47 to the adjusted position shown in FIG. 2, the carriage 7 may be moved to the intermediate position shown in FIG. 3 in which the support member 15 overlies the tank 37, whereupon the support 41 may be raised out of the reservoir 39 to enable the surface of the applicator 42 (which complements the surface 49 of the component 47) to engage the surface 49 and coat the latter with liquid adhesive. After the component 47 has been coated with adhesive, the support 41 may be lowered into the reservoir 39 and the carriage returned to its original position as shown in FIG. 2.

While the carriage 7 is being moved to and from the intermediate position in which adhesive is applied to the surface 49 of the member 47, the platen 33 is raised from the position shown in FIG. 1 to a loading position shown in FIG. 2 at which the second component 48 may be placed by the machine operator atop the support surface 34 of the platen and be secured thereto. Again, the level of the support surface 34 when the platen is in its loading position is one which is ergonomically appropriate for the machine operator, thereby facilitating loading of the component 48 by simply sliding it horizontally onto the platen 33.

When the carriage 7 returns from the intermediate or adhesive application station to its initial position, the surfaces 49 and 50 of the components 47 and 48, respectively, will directly overlie one another and the components will occupy positions in which their confronting surfaces are in register. Following the return of the carriage to its initial position, the platen 33 is moved upwardly a distance sufficient to enable the confronting surfaces 49 and 50 of the two components to engage one another, and the platen is maintained in such elevated position for a predetermined period of time sufficient to enable the two components to bond to one another. Following the elapse of the predetermined time interval the application of suction to the upper component 47 is terminated, thereby releasing such component from the support member 15. The adhered components 47 and 48 then will be supported entirely by the platen 33.

Following release of the component 47 from the support 15 the platen 33 is lowered to the loading position referred to earlier, whereupon the application of suction to the component 48 is terminated, thereby enabling the bonded components 47 and 48 to be removed from the platen. Thereafter, the means for anchoring the member 15 in its adjusted position is released and the member rotated about the axis A to its loading position. During this movement of the member 15 the platen 33 is lowered to its original position. The apparatus then is in condition to perform another cycle of operation.

As is shown in FIG. 1, the left hand end of the machine frame 2 lies in a vertical plane P. This plane also defines a workstation at which the machine operator stands. The rotary movements of the member 15 (in the directions of the arrow B) are such that, at no time does any part of the member 15 or the component supporting thereon extend beyond the plane P. Consequently, the possibility of injury to the machine operator by the member 15 or anything supported thereon is minimized.

The disclosed embodiment is representative of a presently preferred form of the invention, but is intended to be illustrative rather than definitive thereof. The invention is defined in the claims.

I claim:

1. Apparatus for use in assembling a pair of separate members with one another, said apparatus comprising a first support having a surface for removably supporting one of said members; a second support having a surface for removably supporting the other of said members, each of said first and second supports occupying a first position in which their said surfaces face in the same direction and in which said first support is at a predetermined ergonomically appropriate level above that of said second support; means for rotating one of said supports to an adjusted position in which its said surface confronts said surface of the other of said supports; and means for relatively moving said supports toward one another while said one of said supports is in said adjusted position a distance sufficient to enable the members supported by their respective supports to engage one another, wherein said first support when rotated to said adjusted position is at a level above that occupied by said first support when the latter is in said first position.

2. Apparatus according to claim 1 wherein in said first position said surfaces face upwardly.

3. Apparatus according to claim 1 wherein said first and adjusted positions are about 180° displaced from one another.

4. Apparatus according to claim 1 wherein said means for relatively moving said supports effects movement of said second support toward said first support.

5. Apparatus according to claim 1 including means for moving said one of said supports to an intermediate position from said adjusted position and back to said adjusted position prior to the relative movement of said supports toward one another.

6. Apparatus according to claim 5 including means for applying a coating of adhesive to a member supported by said one of said supports while said one of said supports is in said intermediate position.

7. Apparatus according to claim 1 wherein said first position of said one of said supports is one wherein said surface thereof is substantially horizontal.

8. Apparatus according to claim 1 wherein the adjusted position of said one of said supports is one wherein said surface thereof is substantially horizontal.

9. Apparatus according to claim 8 wherein said first position of said one of said supports is one wherein said surface thereof is substantially horizontal.

10. Apparatus for use in assembling a pair of separate members with one another, said apparatus comprising a frame having at one end thereof a loading and unloading station; a first support mounted on said frame adjacent said one end thereof at a predetermined ergonomically appropriate level and having a first supporting surface for the removable accommodation of one of said members; a second support mounted on said frame adjacent said one end thereof for vertical movements from a lowered position to an elevated position, and return, said second support having a supporting surface; means for rotating said first support from a first position in which said supporting surfaces face upwardly to a second position in which said first supporting surface faces downwardly and overlies the supporting surface of said second support; and means for effecting relative movement of said first and second supports toward one another while said first support is in said second position a distance sufficient to enable members supported on the respective supports to engage one another.

11. The apparatus according to claim 10 wherein the supporting surface of said first support is substantially horizontal in each of said first and second positions.

12. The apparatus according to claim 10 including means for moving said first support while in said second position to an intermediate position remote from said one end of said frame, and return; and means for applying adhesive to a member supported on said first support at said intermediate position.

13. The apparatus according to claim 10 wherein said one end of said frame lies in a vertical plane, and wherein the direction and extent of rotation of said first support are such that no part of said first support extends beyond said plane in the direction of said station.

\* \* \* \* \*